Patented Nov. 13, 1928.

1,691,428

UNITED STATES PATENT OFFICE.

HERMANN BERTHOLD, OF LEVERKUSEN-ON-THE-RHINE, GERMANY, ASSIGNOR TO GRASSELLI DYESTUFF CORPORATION, OF NEW YORK, N. Y., A CORPORATION OF DELAWARE.

PROCESS FOR THE MANUFACTURE OF AMINOANTHRAQUINONES.

No Drawing. Application filed October 27, 1927, Serial No. 229,257, and in Germany December 2, 1925.

The present invention relates to a process of reducing nitroanthraquinones and their nuclear substitution products.

According to the invention nitroanthraquinones and their nuclear substitution products are reduced by means of hydrogenated bases of the quinoline series, such as tetrahydroquinoline, 1.2.3.4-tetrahydro-2-methylquinoline; the reaction proceeds smoothly.

It is easily possible in my new process to conduct the reaction by the appropriate addition of diluents of various kinds, such as for example, organic solvents, like ortho-dichlorobenzene, pyridine, tetrahydronaphthalene or hydrochloric acid, glacial acetic acid and the like with the result that, for example, the dinitro-compounds are reduced to diamino-compounds or to aminonitro-compounds or to hydroxylamino-compounds.

Accordingly by means of this reaction 1-amino-5-nitro and 1-amino-8-nitro-anthraquinones are produced in good yield. It is worthy of note that the reaction proceeds at comparatively low temperatures and without catalysts. Furthermore a technical advantage is found in the fact that by the employment of 2-methylquinoline as the diluent the mixture of the latter and of the unoxidized hydromethylquinoline can again be catalytically hydrogenated, hence in the new process, hydrogen is the real reducing agent, while the base acts as a carrier only.

The following examples will illustrate the principles underlying our invention:

*Example 1.*—1 part by weight of technically pure 1.5-dinitroanthraquinone is heated to boiling for 8 hours with 1 part by weight of 2-methylquinoline, 1 part by weight of crude 1.2.3.4-tetrahydro-2-methylquinoline (boiling point 252–279° C.) and 2 parts by weight of glacial acetic acid. On cooling pure 1-amino-5-nitro-anthraquinone separates out in reddish brown crystals, which are soluble in 40% oleum with a red coloration. On adding caustic soda solution to the filtrate the mixture of 2-methylquinoline and its hydrogenated compounds can be separated and again catalytically hydrogenated after distillation.

The reduction proceeds according to the following equation:

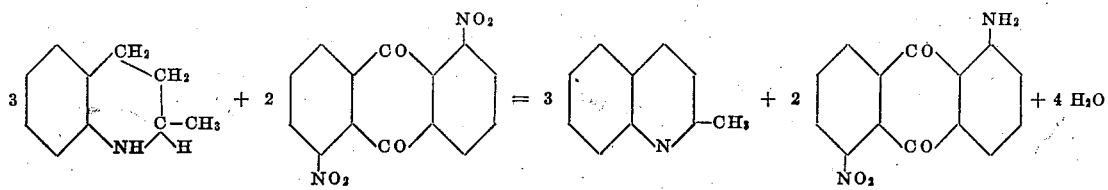

*Example 2.*—1 part by weight of 1.5-dinitroanthraquinone and 10 parts by weight of 1.2.3.4-tetrahydro-2-methylquinoline are heated to 125° C. in the course of two hours, until crystals of 1.5-dihydroxylamino-anthraquinone separate out from the solution in good yield. When, however, the said mixture is heated to boiling, or when 1 part by weight of 1.5-dinitroanthraquinone, 2 parts by weight of tetrahydromethylquinoline, and 0.2 parts by weight of pyridine are immediately heated to boiling, the reaction product will be 1.5-diaminoanthraquinone, which dissolves in 40% oleum with a blue coloration.

*Example 3.*—10 parts by weight of 1.5-dichloro-4-nitroanthraquinone are heated under reflux with 15 parts by weight of tetrahydromethylquinoline and 15 parts by weight of glacial acetic acid for 4 hours. On cooling red needles of 1.5-dichloro-4-aminoanthraquinone separate out.

*Example 4.*—10 parts by weight of 1.8-dinitroanthraquinone are heated under reflux for 5 hours with 20 parts by weight of 1.2.3.4-tetrahydroquinoline and 20 parts by weight of glacial acetic acid. The reaction mixture assumes a reddish brown coloration and gradually goes into solution, after which reddish brown crystals of 1-amino-8-nitro-anthraquinone separate out.

I claim:

1. The process which comprises treating an α-nitroanthraquinone with a hydrogenated base of the quinoline series.

2. The process which comprises treating an α-nitroanthraquinone with a hydrogenated base of the quinoline series in the presence of a diluent.

3. The process for the manufacture of 1-amino-5-nitroanthraquinone which comprises heating 1.5-dinitroanthraquinone with 1.2.3.4-tetrahydro-2-methylquinoline as a reducing agent in the presence of 2-methylquinoline.

In testimony whereof I have hereunto set my hand.

HERMANN BERTHOLD.